United States Patent [19]

Sugisaki

[11] Patent Number: 5,177,674
[45] Date of Patent: Jan. 5, 1993

[54] FUSED SOLID ELECTROLYTIC CAPACITOR

[75] Inventor: Yukio Sugisaki, Tokyo, Japan

[73] Assignee: NEC Corporation, Tokyo, Japan

[21] Appl. No.: 827,079

[22] Filed: Jan. 28, 1992

[30] Foreign Application Priority Data

Feb. 1, 1991 [JP]  Japan .................................. 3-11816

[51] Int. Cl.$^5$ ............................................. H01G 9/00
[52] U.S. Cl. .................................................. 361/534
[58] Field of Search ............... 29/25.03; 361/534, 539, 361/540

[56] References Cited

U.S. PATENT DOCUMENTS

| | | | |
|---|---|---|---|
| 4,763,228 | 8/1988 | Su ......................................... | 361/534 |
| 4,899,258 | 2/1990 | Semblancay ......................... | 361/534 |
| 5,053,927 | 10/1991 | Baker et al. .......................... | 361/534 |
| 5,068,766 | 11/1991 | Hilbert ................................. | 361/534 |

*Primary Examiner*—Donald A. Griffin
*Attorney, Agent, or Firm*—Laff, Whitesel, Conte & Saret

[57] ABSTRACT

A fused solid electrolytic capacitor comprises a cathode part formed by applying a first external conductive layer on the solid electrolyric capacitor element, connecting a fuse wire to the first external conductive layer, applying, in turn, an insulating resin layer and a second external conductive layer onto the solid electrolytic capacitor element so that an electrical bridge is formed between the first and second external conductive layers of the solid electrolytic capacitor through the fuse wire which is connected to the first external conductive layer and then electrically connecting the second external conductive layer and the external cathode terminal. According to such a capacitor structure, the fuse wire would not be broken due to, for instance, vibration, the reliability of connection of the fuse wire and yield of the capacitor are markedly improved since the fuse wire is firmly fixed. Further, the production processes can be simplified and after incorporating the fuse into the element, the capacitor can be produced according to the production lines common to those for capacitors in which any fuse is not incorporated.

12 Claims, 3 Drawing Sheets

FIG. I
PRIOR ART
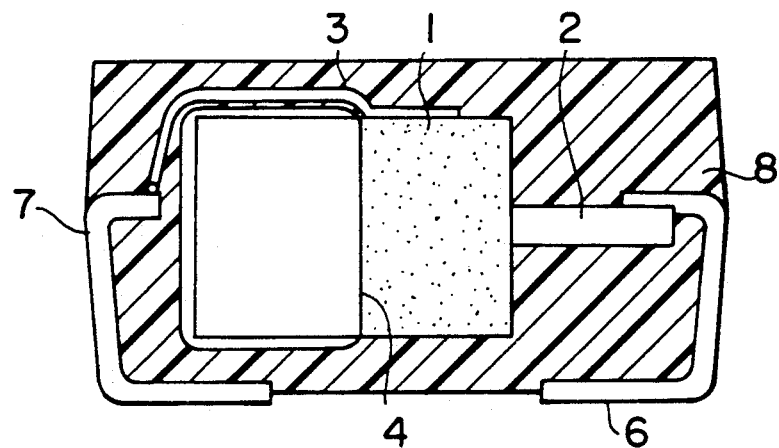
FIG. 2(a)
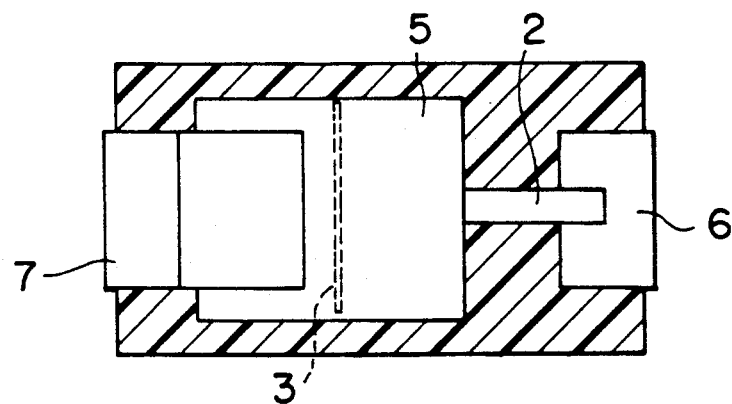
FIG. 2(b)
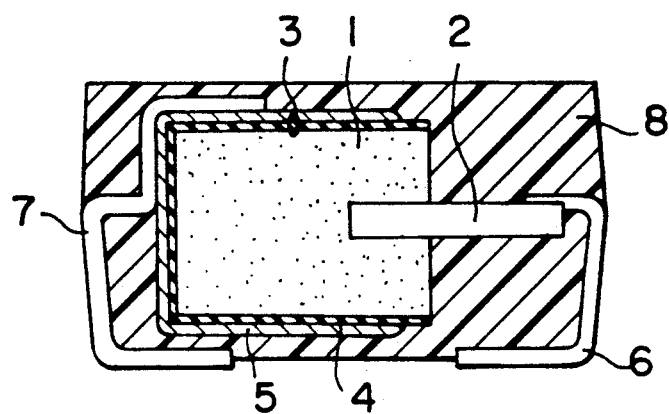

FUSED SOLID ELECTROLYTIC CAPACITOR

BACKGROUND OF THE INVENTION

1. Field of the Invention

The present invention relates to a fused solid electrolytic capacitor and more specifically to a fuse wire-connecting structure of the fused solid electrolytic capacitor.

2. Description of the Prior Art

Chip type solid electrolytic capacitors having a low fault rate have widely been used in a variety of electronic circuits. A possible fault is the formation of a short circuit which leads to excessive heating of the capacitor element and, in the worst case, results in burning of the capacitor. For this reason, a fuse has been incorporated into a solid electrolytic capacitor of this type.

Up to now, various kinds of such fused solid electrolytic capacitors have been proposed. For instance, there has been known a fused solid electrolytic capacitor in which a part of a cathode layer at the outer periphery of a solid electrolytic capacitor element is coated with an insulating material, the cathode layer is connected to an external cathode terminal through a fuse wire and the capacitor is packaged with an insulating material (Japanese Unexamined Patent Publication No. Sho 62-237716); or which comprises, as shown in FIG. 1, an anode part comprising an anode lead 2 implanted in a solid electrolytic capacitor element 1 at the central portion thereof and an anode external terminal 6 which are connected to one another through, for instance, welding and a cathode part comprising a cathode external terminal 7 and a fuse wire 3 which connects the cathode external terminal to the surface of the capacitor element 1 through soldering and a resin layer packaging the element.

The fused solid electrolytic capacitors described above have a structure in which, after connecting an anode lead to an external anode terminal, the surface of the capacitor element is electrically connected to an external cathode terminal through a fuse wire and, therefore, the connection and shaping of the fuse wire are very difficult. Further, the fuse wire is not fixed except for the ends thereof and thus the capacitor suffers from a variety of drawbacks such as breakage of the fuse wire after the connection thereof due to, for instance, vibration which leads to the reduction in production yield. Accordingly, visual inspection is required after the connection of the fuse and correspondingly mass-production of the capacitors of this type is very difficult.

SUMMARY OF THE INVENTION

Accordingly, an object of the present invention is to provide a fused solid electrolytic capacitor which never causes any breakage of a fuse wire due to, for instance, vibration, has high reliability of the fuse connection, provides improved yield, makes it possible to markedly simplify the manufacturing processes and is quite suitable for mass-production.

The foregoing object of the present invention can effectively be achieved by providing a fused solid electrolytic capacitor which comprises a solid electrolytic capacitor element; an anode part comprising an anode lead rising from the solid electrolytic capacitor element and an external anode terminal connected to the anode lead; and a cathode part comprising a cathode layer formed on the solid electrolytic capacitor element and an external cathode terminal which are connected to one another through a fuse to give the cathode part, wherein the cathode part is formed by applying a first external conductive layer on the solid electrolytic capacitor element, connecting a fuse wire to the first external conductive layer, applying, in turn, an insulating resin layer and a second external conductive layer onto the solid electrolytic capacitor element so that an electrical bridge is formed between the first and second external conductive layers of the solid electrolytic capacitor through the fuse wire which is connected to the first external conductive layer and then electrically connecting the second external conductive layer to the external cathode terminal.

BRIEF DESCRIPTION OF THE DRAWINGS

The aforementioned and other objects, features and advantages of the present invention will become more apparent from the following description taken with reference to the accompanying drawings, wherein FIG. 1 is a sectional view of a conventional fused chip type solid electrolytic capacitor;

FIG. 2a is a plan view of a first embodiment of the fused chip type solid electrolytic capacitor, in which the top portion of the resin package is removed, according to the present invention and FIG. 2b is a sectional view of the first embodiment shown in FIG. 2a;

DESCRIPTION OF THE PREFERRED EMBODIMENTS

Figure 3:
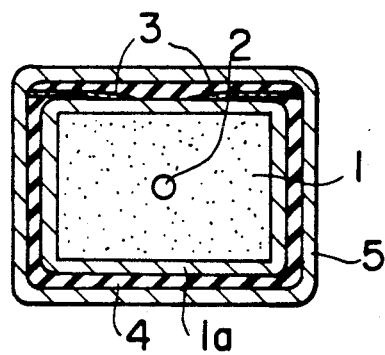
FIG. 3 is a sectional view of the first embodiment of the fused chip type solid electrolytic capacitor for illustrating the structure in which a fuse wire is connected.

The fused chip type solid electrolytic capacitor according to the present invention will be explained in more detail with reference to the accompanying drawings.

First referring to FIGS. 2a and 2b which are, respectively, a plan view and a sectional view of a first embodiment of the fused chip type solid electrolytic capacitor, in which the top portion of the resin package is removed, according to the present invention, the first embodiment of the fused chip type solid electrolytic capacitor comprises a solid electrolytic capacitor element 1, an anode part and a cathode part. The anode part comprises an anode lead 2 a part of which is implanted in the solid electrolytic capacitor element 1 at the central portion thereof and an external anode terminal 6. The anode lead and the external anode terminal are connected to one another at the exposed end of the lead to give the anode part. The cathode part comprises a first conductive layer 1a (see FIG. 3) applied onto the side face of the element 1, a fuse wire 3 connected to the first conductive layer 1a such as a solder layer, an insulating resin layer 4 covering the fuse wire and the first conductive layer, a second conductive layer 5 such as a silver paste layer which is electrically connected to both ends of the fuse wire and an external cathode terminal 7 whose one end is electrically connected to the second conductive layer 5. The assembly is packaged in an insulating resin 8 while parts of the cathode and anode external terminals are exposed.

The fused solid electrolytic capacitor according to the first embodiment can, for instance, be prepared as follows. First, an anode body is formed through press-molding powder of a valve metal such as tantalum or aluminum while a part of the anode lead 2 is embedded therein and then sintering the press-molded anode body in vacuo. Then the anode body is subjected to anodic oxidation and a manganese oxide layer, a carbon layer, a plating layer and a solder layer 1a are applied onto the resulting anodized layer, in this order, to give a solid electrolytic capacitor element 1 (whereinafter referred to as simply "element 1").

Figure 4A:
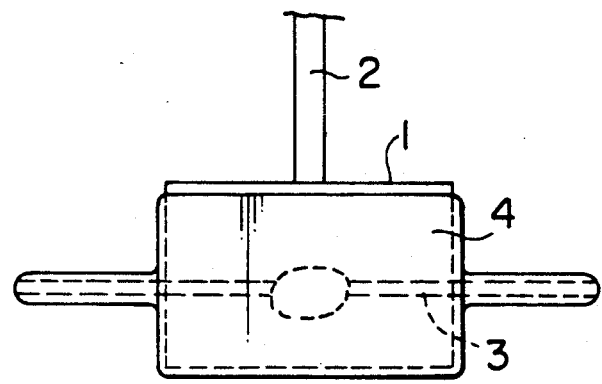
FIGS. 4a and 4b are plan views of the first embodiment of the fused chip type solid electrolytic capacitor for illustrating a method for connecting the fuse wire.
Figure 4B:
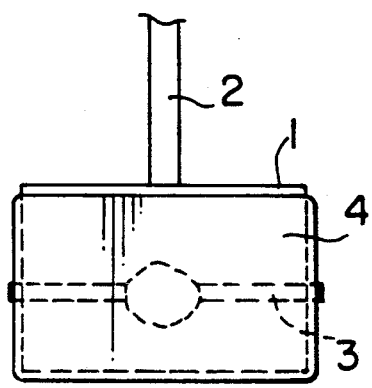

Then, as shown in FIG. 3, a fuse wire 3 comprising a high temperature solder wire having a diameter of about 0.1 mm is connected to the solder layer 1a (corresponding to the first external conductive layer) on the surface of the element 1 through soldering and then an insulating resin layer 4 is applied thereto to give a product shown in FIG. 4a. Then both ends of the fuse wire 3 which are protruded from the element 1 are cut off (see FIG. 4b). Finally, a second external conductive layer 5 such as a silver paste layer is applied onto the element 1. Thus, both ends of the fuse wire 3 exposed are connected to the second external conductive layer 5 to give the first embodiment of the element 1 having a built-in fuse as shown in FIG. 3. A plurality of fuse wires may be used in the fused solid electrolytic capacitor according to the present invention.

On the other hand, the anode lead 2 implanted in the element 1 is connected to an external anode terminal 6 through, for instance, welding and then the external cathode terminal 7 is brought into contact with the side face of the element 1 provided with the built-in fuse, connected thereto with a conductive paste (not shown) to thus form terminals, followed by packaging the assembly with an insulating resin 8 while exposing parts of the anode and cathode external terminals. In this manner, there can be produced a fused chip type solid electrolytic capacitor as shown in FIG. 2 according to the first embodiment of the present invention.

Figure 5:
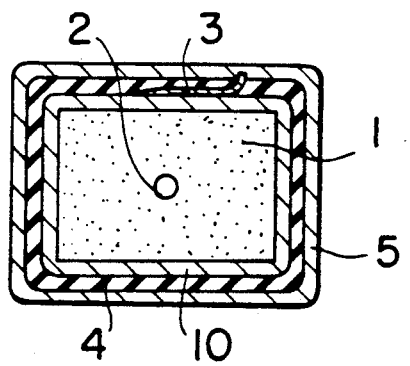
FIG. 5 is a sectional view of a second embodiment of the fused chip type solid electrolytic capacitor according to the present invention for illustrating the structure in which a fuse wire is connected.
Figure 6A:
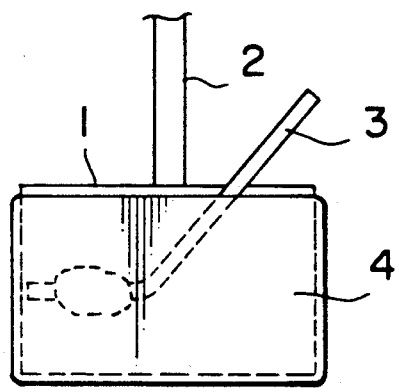
FIGS. 6a and 6b are plan views of the second embodiment of the fused chip type solid electrolytic capacitor for illustrating a method for connecting the fuse wire.
Figure 6B:
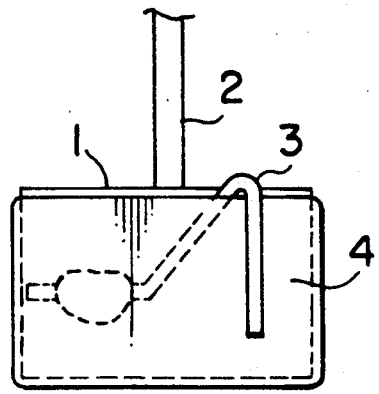

Referring now to FIGS. 5, 6a and 6b, there is depicted a second embodiment of the fused chip type solid electrolytic capacitor according to the present invention. FIG. 5 is a sectional view for illustrating the structure of the second embodiment of the capacitor of the present invention and FIGS. 6a and 6b are plan views for illustrating the manner of connection of the fuse wire in the second embodiment of the capacitor.

The second embodiment has a capacitor structure, as shown in FIG. 5, which is almost similar to that of the first embodiment and simply differs from the latter in the manner of connection of a fuse wire. In this embodiment, a fuse wire 3 comprising a high temperature solder wire having a diameter of about 0.1 mm is connected to a solder layer 1a on the surface of a solid electrolytic capacitor element 1 at one end of the fuse wire 3 through soldering, the fuse wire is bent towards an anode lead 2 at the vicinity of the end at which it is connected to the layer 1a, an insulating resin layer 4 is applied to the element 1 as shown in FIG. 6a and then the other end of the fuse wire 3 which is protruded from the element 1 is bent so that it comes in contact with the surface of the insulating resin layer 4 (see FIG. 6b). Thereafter, a silver paste layer 5 is applied onto the element 1. Thus, the fuse wire 3 is connected to the silver paste layer 5 to give an element 1 having a built-in fuse according to the second embodiment of the present invention as shown in FIG. 5. Anode and cathode parts are then formed in the same manner described above in connection with the production of the first embodiment to give a fused chip type solid electrolytic capacitor according to the second embodiment of the present invention.

Although the present invention has been explained above while taking a chip type solid electrolytic capacitor, it is a matter of course that conventional anode and cathode parts for dip type capacitors are formed on the element 1 having the built-in fuse explained above to give a fused dip type solid electrolytic capacitor. Thus, the present invention can likewise be applied to fused dip type solid electrolytic capacitors.

As has been explained above in detail, the following effects can, for instance, be achieved by designing a solid electrolytic capacitor so as to have a built-in fuse according to the present invention:

1) A fuse wire would not be broken due to, for instance, vibration and the reliability of connection of the fuse wire and yield of the capacitor of this type can markedly be improved since the fuse wire is firmly fixed therein;

2) The production processes can markedly be simplified as compared with the conventional methods since it is not necessary to connect the fuse to an external cathode terminal; and 3) After incorporating a fuse into the element 1, the capacitor can be produced according to the production lines common to those for capacitors in which any fuse is not incorporated.

What is claimed is:

1. A fused solid electrolytic capacitor which comprises a solid electrolytic capacitor element; an anode part comprising an anode lead rising from the solid electrolytic capacitor element and an external anode terminal connected to the anode lead; and a cathode part comprising a cathode layer formed on the solid electrolytic capacitor element and an external cathode terminal which are connected to one another through a fuse, wherein the cathod part is formed by applying a first external conductive layer on the solid electrolytic capacitor element, connecting a fuse wire to the first external conductive layer, applying, in turn, an insulating resin layer and a second external conductive layer onto the solid electrolytic capacitor element so that an electrical bridge is formed between the first and second external conductive layers of the solid electrolytic capacitor through the fuse wire which is connected to the first external conductive layer and then electrically connecting the second external conductive layer to the external cathode terminal.

2. The fused solid electrolytic capacitor according to claim 1 wherein the cathode part is formed by connecting the fuse wire to the first external conductive layer on the surface of the element through soldering, applying the insulating resin layer thereto, then cutting off both ends of the fuse wire which are protruded from the element, applying the second external conductive layer onto the element to connect the exposed ends of the fuse wire to the second external conductive layer.

3. The fused solid electrolytic capacitor according to claim 1 wherein the cathode part is formed by connecting one end of the fuse wire to the first external conductive layer on the surface of the element through soldering, bending the fuse wire towards the anode lead at the vicinity of the end at which it is connected to the first conductive layer, applying the insulating resin layer to the element, then bending the other end of the fuse wire which is protruded from the capacitor element so that it comes in contact with the surface of the insulating resin layer and applying the second conductive layer onto the element so that the second layer is connected to the fuse wire.

4. The fused solid electrolytic capacitor according to claim 1 wherein the capacitor is a chip type solid electrolytic capacitor.

5. The fused solid electrolytic capcitor according to claim 1 wherein the capacitor is a dip type solid electrolytic capacitor.

6. The fused solid electrolytic capacitor according to claim 1 wherein the capacitor is a chip type solid electrolytic capacitor and the cathode part is formed by connecting the fuse wire to the first external conductive layer on the surface of the element through soldering, applying the insulating resin layer thereto, then cutting off both ends of the fuse wire which are projected from the capacitor element, applying the second external conductive layer onto the element to connect the exposed ends of the fuse wire to the second external conductive layer.

7. The fused solid electrolytic capacitor according to claim 1 wherein the capacitor is a chip type solid electrolytic capacitor and the cathode part is formed by connecting one end of the fuse wire to the first external conductive layer on the surface of the element through soldering, bending the fuse wire towards the anode lead at the vicinity of the end at which it is connected to the first conductive layer, applying the insulating resin layer to the element, then bending the other end of the fuse wire which is protruded from the capacitor element so that it comes in contact with the surface of the insulating resin layer and applying the second conductive layer onto the element so that the second layer is connected to the fuse wire.

8. The fused solid electrolytic capacitor according to claim 1 wherein the capacitor is a dip type solid electrolytic capacitor and the cathode part is formed by connecting the fuse wire to the first external conductive layer on the surface of the element through soldering, applying the insulating resin layer thereto, then cutting off both ends of the fuse wire which are projected from the capacitor element, applying the second external conductive layer onto the element to connect the exposed ends of the fuse wire to the second external conductive layer.

9. The fused solid electrolytic capacitor according to claim 1 wherein the capacitor is a dip type solid electrolytic capacitor and the cathode part is formed by connecting one end of the fuse wire to the first external conductive layer on the surface of the element through soldering, bending the fuse wire towards the anode lead at the vicintity of the end at which it is connected to the first conductive layer, applying the insulating resin layer to the element, then bending the other end of the fuse wire which is protruded from the capacitor element so that it comes in contact with the surface of the insulating resin layer and applying the second conductive layer onto the element so that the second layer is connected to the fuse wire.

10. The fused solid electrolytic capacitor according to claim 1 wherein the first conductive layer is a solder layer.

11. The fused solid electrolytic capacitor according to claim 1 wherein the second conductive layer is a silver paste layer.

12. The fused solid electrolytic capacitor according to claim 1 wherein the fuse wire is a solder wire.

* * * * *